United States Patent [19]

Terada et al.

[11] Patent Number: 5,102,649

[45] Date of Patent: Apr. 7, 1992

[54] PROCESS FOR PRODUCING PEROXONIOBIC ACID SOL

[75] Inventors: Yasuhiko Terada, Ashiya; Kazunobu Abe, Izumi; Hajime Uno, Sakai; Shinichi Shirasaki, Ibaragi, all of Japan

[73] Assignees: Sakai Chemical Industry Co., Osaka; National Institute for Research in Inorganic Materials, Ibaragi, both of Japan

[21] Appl. No.: 611,265

[22] Filed: Nov. 13, 1990

[30] Foreign Application Priority Data

Nov. 13, 1989 [JP]   Japan ................................ 1-294184

[51] Int. Cl.$^5$ ................... C01B 15/055; C01B 15/04; C01G 33/00
[52] U.S. Cl. ..................................... 423/592; 423/644
[58] Field of Search ..................... 423/592, 644

[56] References Cited

U.S. PATENT DOCUMENTS 2,259,396  10/1941  Schlecht et al. ................ 423/592
3,873,584   3/1975  Barke et al. ..................... 260/407

FOREIGN PATENT DOCUMENTS 51-10197  7/1974  Japan ................................. 423/592
57-3717   6/1980  Japan ................................. 423/592
242158    3/1967  U.S.S.R. ............................ 423/592

Primary Examiner—John Niebling
Assistant Examiner—Brian M. Bolam
Attorney, Agent, or Firm—Wegner, Cantor, Mueller & Player

[57] ABSTRACT

A process for producing a peroxoniobic acid sol which comprises: adding a strong acid, hydrogen peroxide and water to at least one niobium compound selected from the group consisting of niobium hydroxide, niobium oxide and niobium pentachloride to provide an aqueous solution of peroxoniobic acid; and then maintaining the aqueous solution at a temperature of 5°–50° C.

10 Claims, No Drawings

PROCESS FOR PRODUCING PEROXONIOBIC ACID SOL

BACKGROUND OF THE INVENTION

This invention relates to a process for producing peroxoniobic acid sol.

Much attention has been recently paid to functional ceramics suitable for use as a piezoelectric element, semiconductor, sensor, optoelectronics material, dielectric and the like. Niobium is one of the important components of such functional ceramics.

In the production of, for example, niobium-containing dielectric ceramics, it is desirable to use such a high quality powder material as is easy to sinter at low temperatures and is composed of perovskite phase only of high dielectric constant. Hence it is necessary to prepare a powder material with use of a niobium material which has a uniform, very small particle size and a narrow particle size distribution.

A niobium material has hitherto been produced by, for instance, admixing precipitates of such as hydroxides or carbonates of elements other than niobium with a slurry of commercially available niobium oxide or niobium hydroxide having a large and uneven particle size. This method, therefore, fails to provide a niobium powder material having a uniform and very small particle size.

SUMMARY OF THE INVENTION

Accordingly, it is an object of the invention to provide a process for producing a peroxoniobic acid sol suitable not only for use as a niobium material in the production of niobium-containing ceramics but also for use as a material where a high dispersibility of a niobium component is required.

In accordance with the invention, there is provided a process for producing a peroxoniobic acid sol which comprises: adding a strong acid, hydrogen peroxide and water to at least one niobium compound selected from the group consisting of niobium hydroxide, niobium oxide and niobium pentachloride to provide an aqueous solution of peroxoniobic acid; and then maintaining the aqueous solution at a temperature of 5°–50° C.

DESCRIPTION OF PREFERRED EMBODIMENTS

The strong acid preferably used is concentrated hydrochloric acid or concentrated nitric acid. The strong acid is used, when it is a monobasic acid, in an amount of five mols in relation to one mol of niobium. Hydrogen peroxide is used in an amount of four mol in relation to one mol of niobium for peroxidization of the niobium compound to form an aqueous solution of complexes of peroxoniobic acid.

The process of the invention will now be described in more detail. The process comprises the first step of adding aqueous hydrogen peroxide to a mixture of water-insoluble niobic acid or niobium pentachloride, and a strong acid, to prepare an aqueous solution of peroxoniobic complex, and the second step of holding the aqueous solution of the peroxoniobic complex at a temperature of 5°–50° C. for a sufficient period of time to convert the solution to a sol.

Aqueous hydrogen peroxide is added to the mixture of water-insoluble niobic acid or niobium pentachloride at a temperature of not more than room temperature, preferably not more than 5° C., most preferably not more than 0° C.

It is desirable that the resultant peroxoniobic acid sol is purified by treating the sol with an ultrafilter to remove impurity anions such as chloride or nitride ions or cations contained therein. In the ultrafiltration of the sol, it is necessary that the sol is adjusted to the pH in the range of about 1–12, usually of about 1.5 with aqueous ammonia so that the sol can be ultrafiltered. After the ultrafiltration, the sol has a pH usually of about 4.

The sol formation or sollation of the solution of peroxoniobic acid is carried out at a temperature of 5°–50° C. usually over a period of about three hours, although depending upon the sollation temperature employed. When the sollation temperature is less than 5° C., much time is undesirably needed for sollation, although a sol of small particle size is obtained. When the sollation temperature is more than 50° C., the resultant sol has a large particle size, which needs undesirably a high calcining temperature to produce a powder material for ceramics.

The storage of the peroxoniobic acid sol makes the sol nonuniform and makes the particles larger. Thus, it is advantageous to add a water-soluble organic dibasic acid as a stabilizer such as oxalic acid, malonic acid or succinic acid in an amount of about one mol per mol of niobium in the solution to suppress the proceeding of sollation of the solution. The sol is prepared when used by adding aqueous ammonia to the solution in an amount equivalent to the stabilizer to decompose the stabilizer.

The invention will now be set forth more specifically with reference to examples, however, the invention is not restricted thereto, and various modifications may be made thereto within the spirit and scope of the invention.

EXAMPLE 1

An amount of 0.2 mol of niobium hydroxide (available from Mitsui Mining & Smelting Co., Ltd.) was dispersed in 300 ml of pure water, and after adding 1 mol of concentrated hydrochloric acid thereto, 0.8 mol of hydrogen peroxide was gradually added under stirring. Then an additional amount of pure water was added to the mixture to convert niobium hydroxide into a peroxoniobic complex, thereby to provide one liter of an aqueous solution of the complex. The solution was then held at a temperature of 45° C. for 48 hours to provide a peroxoniobic acid sol.

A 6-N ammonia water was then added dropwise to the peroxoniobic acid sol to adjust the pH to 1.5 so as to enable ultrafiltration. The particle size of the colloidal particles of the sol was 0.02 microns as measured by laser particle size analysis system LPA-3000/3100 available from Otsuka Elctronics.

The peroxoniobic acid sol was purified by passing the sol through an ultrafilter of polysulfone having a differential molecular weight of 10,000 to remove impurity ions such as chloride ions therefrom.

EXAMPLE 2

An amount of 0.2 mol of the same niobium hydroxide as hereinbefore was dispersed in 300 ml of pure water, and after adding 1 mol of concentrated hydrochloric acid thereto, 0.8 mol of hydrogen peroxide was gradually added under stirring. Then an additional amount of pure water was added to the mixture to convert niobium hydroxide into a peroxoniobic complex, thereby to provide one liter of an aqueous solution of the complex.

An amount of 0.2 mol of oxalic acid was added as a stabilizer to the solution. After ten days standing, no precipitates were formed. In contrast, when an aqueous solution of the complex was prepared without the addition of the stabilizer and otherwise in the same manner as above, there were formed yellow precipitates after one day standing.

The above mentioned stabilized solution was neutralized with 0.4 mol of ammonia water to decompose the stabilizer, and the solution was then held at a temperature of 45° C. for 48 hours, to provide a peroxoniobic acid sol.

A 6-N ammonia water was then added dropwise to the peroxoniobic acid sol to adjust the pH to 1.5 so as to enable ultrafiltration. The particle size of the colloidal particles of the sol was 0.02 microns as measured in the same manner as hereinbefore. The peroxoniobic acid sol was then purified by ultrafiltration in the same manner as above.

EXAMPLE 3

A peroxoniobic acid sol was prepared with use of one mol of concentrated nitric acid in place of one mol of concentrated hydrochloric acid and otherwise in the same manner as in Example 1, and then purified in the same manner as in Example 1.

Application of the peroxoniobic acid sol of the invention to production of ceramics will be given below.

APPLICATION EXAMPLE 1

An amount of 500 ml of a strong basic anion exchange resin having an ion exchange capacity of 1.04 eq. per liter of resin available from Sumitomo Chemical Industry Co., Ltd. as Duolite A-101D was added to 500 ml of an aqueous solution of 0.2 mol of magnesium nitrate, and then the mixture was gently stirred for 30 minutes, followed by separation of the resultant hydroxide sol from the ion exchange resin.

The magnesium hydroxide sol and the peroxoniobic acid sol prepared in Example 1 were admixed together under stirring, dried by a spray drying method, and the mixture was then subjected to calcining for two hours at 650° C. in an alumina crucible. This calcining will be refferred to as B-calcining hereinafter.

The average particle size of the B-calcined powder was 0.08 microns as measured in the same manner as hereinbefore. From X-ray analysis, the powder was found to be crystals of $MgNb_2O_6$.

Lead oxide was mixed with the B-calcined powder so as to have a composition of $Pb(Mg_{\frac{1}{3}}Nb_{\frac{2}{3}})O_3$, and the mixture was charged together with pure water into a polyamide pot containing zirconia balls of 5 mm in diameter. The pot was placed in a ball mill to wet mix the mixture for 15 hours, followed by separation of zirconia balls and drying the content. The dried powder thus obtained was calcined in an alumina crucible at 700° C. for two hours to provide a powder material having a composition of $Pb(Mg_{0.33}Nb_{0.66})O_3$ for ceramics production. This calcining will be hereinafter referred to as P-calcining.

The perovskite ratio of the P-calcined powder was calculated by X ray analysis. The result is shown in the table.

The P-calcined powder was wet pulverized in a ball mill for 15 hours. After drying the powder, an 8% by weight aqueous solution of polyvinyl alcohol was added to the powder in an amount of 8% by weight based on the powder to granulate the powder. The granules were then molded under a pressure of 1000 Kg/cm$^2$ into a green mold in the form of pellets.

The green mold was heated at 500° C. for four hours in an electric oven to thermally decompose the polyvinyl alcohol, and then the mold was sintered at a raised temperature of 950° C. over a period of two hours to provide sintered pellets.

The perovskite ratio of the sintered pellets was calculated by X ray analysis. The result is shown in the table.

APPLICATION EXAMPLE 2

Sintered pellets of lead perovskite ceramics were produced with use of the purified peroxoniobic acid sol prepared in Example 2 in place of the purified peroxoniobic acid sol prepared in Example 1, and otherwise in the same manner as in Application Example 1.

The perovskite ratio of the sintered pellets was calculated by X ray analysis. The result is shown in the table.

APPLICATION EXAMPLE 3

Sintered pellets of lead perovskite ceramics were produced with use of the purified peroxoniobic acid sol prepared in Example 3 in place of the purified peroxoniobic acid sol prepared in Example 1, and otherwise in the same manner as in Application Example 1.

The perovskite ratio of the sintered pellets was calculated by X ray analysis. The result is shown in the table.

COMPARATIVE APPLICATION EXAMPLE 1

Powders of magnesium oxide (available from Ube Chemical Industry Co., Ltd.) and the same niobium oxide as hereinbefore were admixed together so as to have a composition of $MgNb_2O_6$. The mixture was charged together with pure water into a polyamide pot containing zirconia balls of 5 mm in diameter. The pot was placed in a ball mill to wet mix the mixture for 15 hours. Thereafter, the zirconia balls were separated, and the mixture was dried and B-calcined.

The B-calcined powder was mixed with lead oxide (available from Dainippon Painting) so as to have a composition of $Pb(Mg_{\frac{1}{3}}Nb_{\frac{2}{3}})O_3$. The mixture was then subjected to the same two-stage calcination and sintering to provide a P-calcined powder and sintered pellets, respectively. The B-calcining, P-calcining and sintering were carried out for two hours at the temperatures shown in the table.

The perovskite ratios of the calcined powder and sintered pellets were calculated by X ray analysis. The results are shown in the table.

COMPARATIVE APPLICATION EXAMPLES 2-4

Ferric oxide (Comparative Application Example 2), cobalt oxide (Comparative Application Example 3) and nickel oxide (Comparative Application Example 4) were used, respectively, in place of magnesium oxide, and otherwise in the manner as in Comparative Application Example 1, powder mixtures were prepared, and subjected to two-stage calcination and sintering, to provide calcined powders and sintered pellets, respectively.

The B-calcining, P-calcining and sintering were carried out for two hours at the temperatures shown in the table.

The perovskite ratios of the calcined powders and sintered pellets thus obtained were calculated by X ray analysis. The results are shown in the table.

As shown in the table, the perovskite ratio of each sintered pellet obtained in Application Examples 1-3 was 100%. In contrast, the perovskite ratio of each sintered pellet obtained in Comparative Application Examples 1-4 was as low as less than 100% (96.5 to 97.5%).

From this fact it was confirmed that all the ceramics produced using the peroxoniobic acid sol of the invention as a niobium material were composed of perovskite phase only, while the ceramics produced using niobium oxide as a niobium material were composed of a mixed phase of perovskite phase and pyrochlore phase.

In the above Application Examples, there was given description of niobium-containing lead perovskite ceramics only, however, it goes without saying that the peroxoniobic acid sol of the invention can be used as a material for the production of a variety of ceramics such as barium titanate or the like as well as lead perovskite ceramics. Further, the peroxoniobic acid sol of the invention is suitable for use where a high dispersibility of niobium component is required.

As set forth above, according to the process of the invention, the peroxoniobic acid sol is obtained which is uniform in composition and very fine in particle size, and thus the sol is suitably applicable not only to a piezoelectric element, semiconductor, sensor, optoelectronics material, dielectric and the like, but also to uses where a high dispersibility of niobium component is required.

TABLE

|  | B-Calcining Temp. × Time (°C.) (hr) | Specific Surface Area of Niobate (B-Calcined Powder) ($m^2/g$) | P-Calcining Temp. × Time (°C.) (hr) | Specific Surface Area of P-Calcined Powder ($m^2/g$) |
|---|---|---|---|---|
| Application Ex. 1 | 650 × 2 | 12.9 | 700 × 2 | 3.2 |
| Application Ex. 2 | 650 × 2 | 13.0 | 700 × 2 | 3.2 |
| Application Ex. 3 | 650 × 2 | 13.1 | 700 × 2 | 3.4 |
| Comparative Application Ex. 1 | 800 × 2 | 4.0 | 900 × 2 | 1.0 |
| Comparative Application Ex. 2 | 900 × 2 | 2.6 | 800 × 2 | 1.3 |
| Comparative Application Ex. 3 | 800 × 2 | 1.8 | 800 × 2 | 0.5 |
| Comparative Application Ex. 4 | 900 × 2 | 0.7 | 900 × 2 | 0.4 |

|  | Perovskite Ratio* (%) | Sintering Temp. × Time (°C.) (hr) | Perovskite Ratio of Sintered Pellets* (%) |
|---|---|---|---|
| Application Ex. 1 | 100 | 950 × 2 | 100 |
| Application Ex. 2 | 100 | 950 × 2 | 100 |
| Application Ex. 3 | 100 | 950 × 2 | 100 |
| Comparative Application Ex. 1 | 90.1 | 1150 × 2 | 96.8 |
| Comparative Application Ex. 2 | 86.5 | 1000 × 2 | 96.5 |
| Comparative Application Ex. 3 | 96.1 | 1000 × 2 | 97.2 |
| Comparative Application Ex. 4 | 90.9 | 1050 × 2 | 97.5 |

*Perovskite Ratio: [I(perovskite (110))/(I(perovskite (110) + I(pyrochlore (222)))] × 100

What is claimed is:

1. A process for producing a peroxoniobic acid sol which comprises: adding a strong acid, hydrogen peroxide and water to at least one niobium compound selected from the group consisting of niobium hydroxide, niobium oxide and niobium pentachloride to provide an aqueous solution of peroxoniobic acid; and then maintaining the aqueous solution at a temperature of 5°-50° C. to convert the solution to a peroxoniobic acid sol.

2. The process as claimed in claim 1 wherein the strong acid is concentrated hydrochloric acid or concentrated nitric acid.

3. The process as claimed in claim 1 wherein the strong acid, hydrogen peroxide and water are added to the niobium compound at a temperature of not more than 5° C.

4. The process as claimed in claim 1 wherein the peroxoniobic acid sol is further purified by means of ultrafiltration.

5. A process for producing a peroxoniobic acid sol which comprises: adding a strong acid, hydrogen peroxide and water to at least one niobium compound selected from the group consisting of niobium hydroxide, niobium oxide and niobium pentachloride to provide an aqueous solution of peroxoniobic acid; adding a water-soluble organic dibasic acid as a stabilizer to the solution; adding aqueous ammonia to the stabilized solution to neutralize the stabilizer; and then maintaining the aqueous solution at a temperature of 5°-50° C. to convert the solution to a peroxoniobic acid sol.

6. The process as claimed in claim 5 wherein the water-soluble organic dibasic acid is oxalic acid, malonic acid or succinic acid.

7. The process as claimed in claim 5 wherein the strong acid is concentrated hydrochloric acid or concentrated nitric acid.

8. The process as claimed in claim 5 wherein the strong acid, hydrogen peroxide and water are added to the niobium compound at a temperature of not more than 5° C.

9. The process as claimed in claim 5 wherein the peroxoniobic acid sol is further purified by means of ultrafiltration.

10. The process as claimed in claim 5, wherein the aqueous ammonia is added in an amount equivalent to the amount of the stabilizer.